May 7, 1935. W. T. PEASE 2,000,352

GATE VALVE CONSTRUCTION

Filed Dec. 26, 1933

Inventor
William T. Pease
By Lyon & Lyon
Attorneys

Patented May 7, 1935

2,000,352

UNITED STATES PATENT OFFICE 2,000,352

GATE VALVE CONSTRUCTION

William T. Pease, Huntington Park, Calif., assignor to Snow Manufacturing Co., Los Angeles, Calif., a corporation of California Application December 26, 1933, Serial No. 703,893

4 Claims. (Cl. 251—155)

REISSUED

This invention relates broadly to gate valves of the type used to regulate the flow of water under relatively low pressures such as are used in large numbers in irrigation systems.

A broad object of the invention is to provide a gate valve that is inexpensive to manufacture and yet has a long life and is not rendered inoperative or leaky by corrosion.

Gate valves of the type involved have commonly been constructed entirely of two or more pieces of galvanized sheet iron, by crimping or soldering the component parts together. Such valves have a short life, however, for the reason that the galvanizing coat is either damaged by the crimping or soldering operation during manufacture or soon wears away at the valve seat in use, thereby exposing the iron to the elements so that it quickly rusts.

In accordance with the present invention the aforementioned defects are eliminated by forming the seat portion of the valve of a die casting metal which is joined in the casting operation to the galvanized iron part or parts of the valve. This provides a solid construction and at the same time eliminates the causes of corrosion, namely, damaged galvanizing and a galvanized valve seat member. The galvanizing coat on the sheet metal part or parts is not damaged during manufacture because the fusing temperature of the die casting metal is lower than the fusing temperature of the galvanizing.

A full understanding of the invention may be had from the following detailed description which refers to the drawing:

Figure 1:
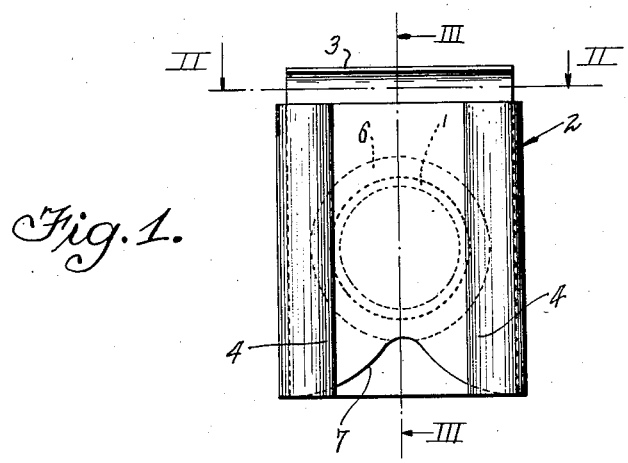
Fig. 1 is an end elevation view of a valve in accordance with the invention.

Referring to the drawing, the valve comprises a tubular member 1 of die casting metal joined to a sheet metal gate supporting member 2 which is adapted to support a sheet metal gate 3 in sliding engagement with one end of the tubular member 1.

The gate supporting member 2 is preferably made of galvanized sheet iron and is provided with an aperture of slightly larger dimensions than the inside dimensions of the pipe member 1. The sides of the sheet member 2 are curled around, as shown at 4, to engage the outer surface of the gate 3. The sheet member of which the member 2 is constructed is sufficiently resilient to at all times maintain sufficient force against the gate 3 to hold it snugly against the end of the tubular member 1 while permitting the gate to slide up and down to cover the end of the pipe 1 to varying degrees to regulate the flow of water therethrough.

Figures 2, 3:
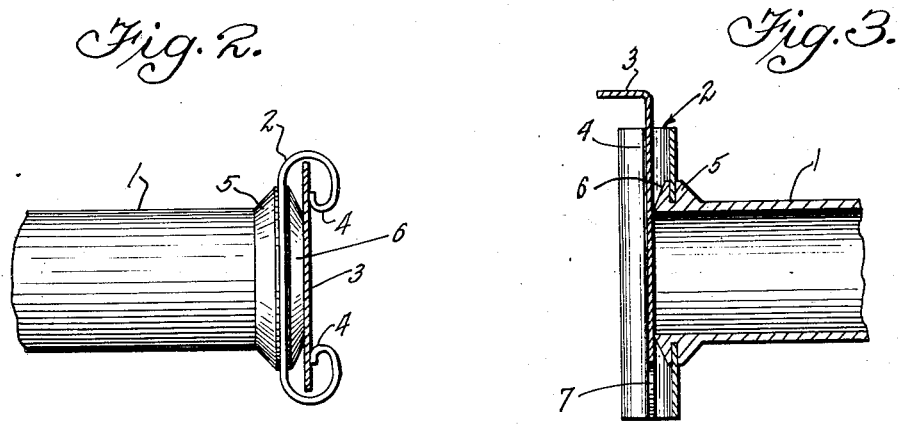
Fig. 2 is a plan view partly in section taken in the plane II—II of Fig. 1.
Fig. 3 is a longitudinal vertical section taken in the plane III—III of Fig. 1.

In the completed valve, as shown to best advantage in Fig. 2, the tubular member 1 is provided with an inner shoulder 5 and an outer shoulder 6 defining a circumferential groove into which the edges of the sheet member 2 fit snugly, whereby the member 2 is solidly supported over the complete circumference of the pipe member 1. The outer face of the outer shoulder 6 is preferably beveled as shown to provide a knife edge seat at the extreme end of the pipe 1 for engagement with the gate 3.

The valve is constructed by positioning a die casting mold about the sheet member 2 and casting the tubular member 1 in place, thus both forming the member 1 and uniting it to the member 2 in a single operation. By reason of the fact that the die casting metal used has a lower melting point than that of zinc, the galvanizing coat on the sheet member 2 is in no sense damaged during the casting operation. At the same time the die casting metal in the ridges 5 and 6 is forced into very close contact with the member 2 so as to grip it solidly.

The side edges 4 of the member 2 may be curled into gate engaging position either before or after the pipe member 1 is formed although it has been found most convenient to perform this operation after the die casting operation.

Because of the fact that the die casting metal is relatively soft and the fact that the outer face of the flange 6 is beveled to a knife edge, this edge is quickly worn by the gate 3, when the valve is put in use, to a smooth seat conforming to the surface of the gate. This seat is therefore maintained during the entire life of the valve by virtue of the fact that the die casting metal is substantially non-corrodible in the presence of water and air.

The gate 3 may be made of any desired metal. It is commonly made of galvanized sheet iron because of its low cost. It is of little consequence whether or not this gate corrodes rapidly for the reason that it is very inexpensive and is therefore easily replaced.

Although the pipe member 1 has been shown as of circular shape, it is to be understood that the invention is not limited to this particular embodiment. The pipe member 1 and its seat may be made of any desired cross sectional shape and likewise the lower end of the gate 3 may be recessed, as shown at 7 in Fig. 1, or may be cut away in any other desired manner to control the shape of orifice produced with the valve in partly open position.

It is to be understood that although the invention has been described with reference to a particular embodiment that the details of construction may be varied without departing from the spirit of the invention which is to be limited only as set forth in the appended claims.

I claim:

1. A gate valve comprising a pipe member of a lower melting point than zinc metal having a seat on one end thereof and a gate supporting member of galvanized iron secured to said pipe member back of said one end of said pipe member, said gate supporting member being adapted to retain a gate in sliding engagement against the seat on the end of said tubular member, said pipe member being joined to said supporting member during the casting operation.

2. In a gate valve, a pipe member of a lower melting point than zinc metal, having a seat on one end thereof and having a circumferential groove in its exterior surface spaced from said seat end, and a gate supporting member of galvanized iron having an orifice therein, the edge of which orifice is contained within said groove in said pipe member, said gate supporting member being adapted to retain a gate in sliding engagement against the seat on the end of said tubular member, said pipe member being joined to said supporting member during the casting operation.

3. A gate valve construction comprising a tubular member of a lower melting point than zinc having a seat on one end thereof, and a galvanized iron gate supporting member having an orifice therein through which said tubular member is extended, in which said tubular member is provided with integral flanges on both sides of said sheet metal member for gripping the orifice edge of said sheet metal member at all points circumferentially on said orifice said pipe member being joined to said supporting member during the casting operation.

4. That method of forming a gate valve consisting of die casting a pipe member having a lower melting point than zinc upon one side of a pre-formed galvanized iron gate supporting member having an aperture, and the forming of a seat during the casting operation, for a gate valve on the opposite side of the gate supporting member than the side on which said pipe member has been formed.

WILLIAM T. PEASE.